April 25, 1961 J. F. MACK 2,981,282
VALVE DEVICE
Filed Sept. 12, 1958 5 Sheets-Sheet 1
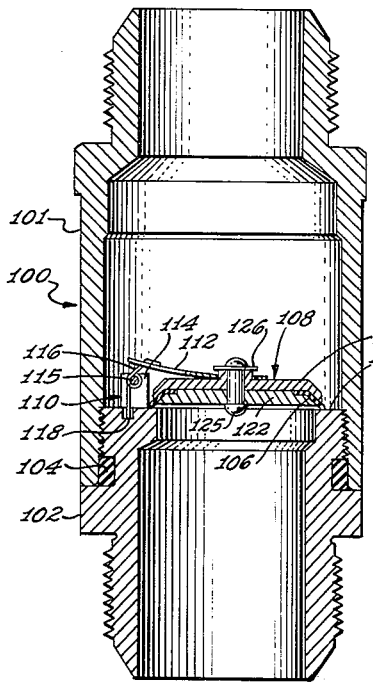
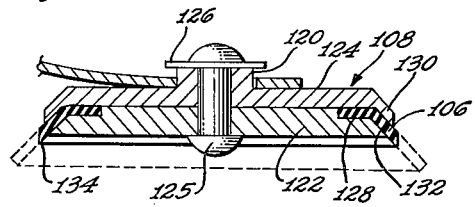
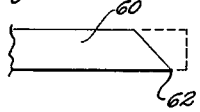
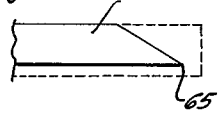
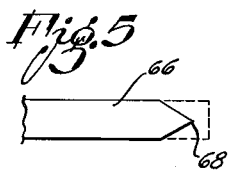
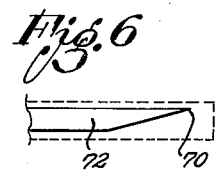
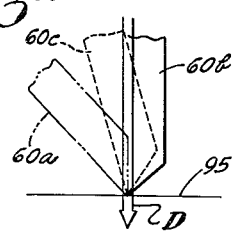
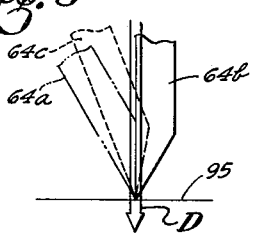
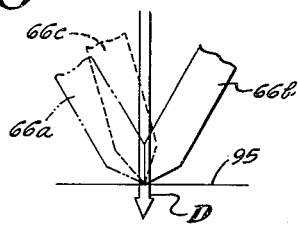
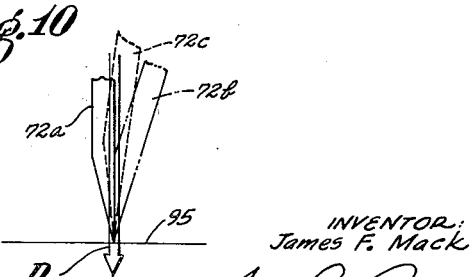
INVENTOR:
James F. Mack
By Smyth & Roston
Attorneys April 25, 1961   J. F. MACK   2,981,282
VALVE DEVICE
Filed Sept. 12, 1958   5 Sheets-Sheet 2
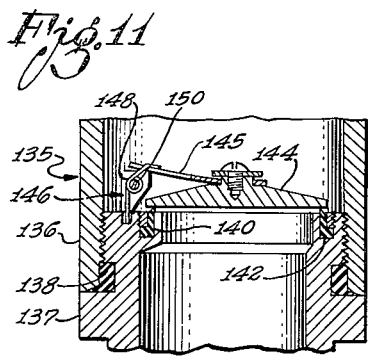
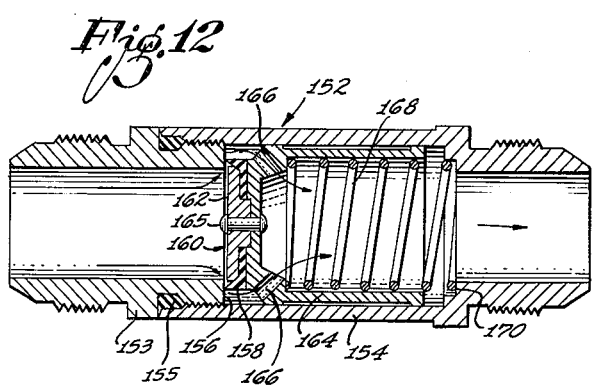
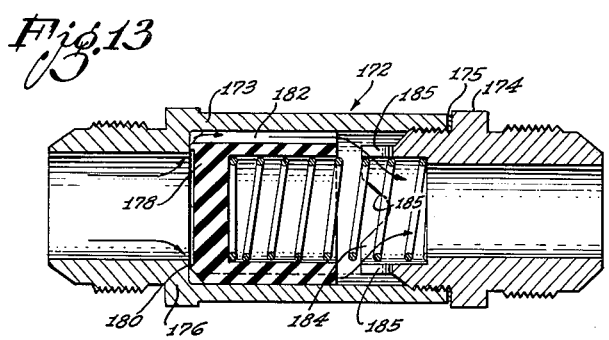
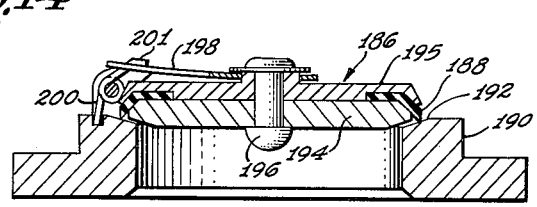
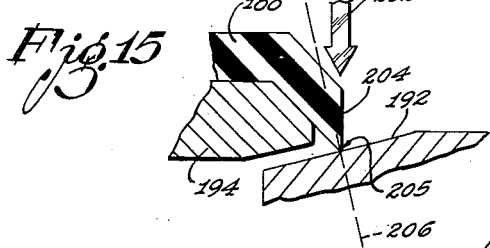
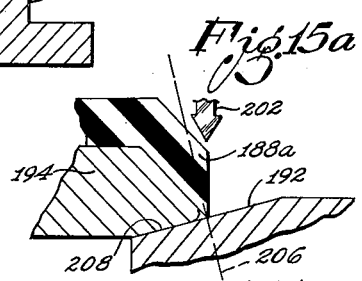
INVENTOR:
James F. Mack
Smyth & Roston
Attorneys

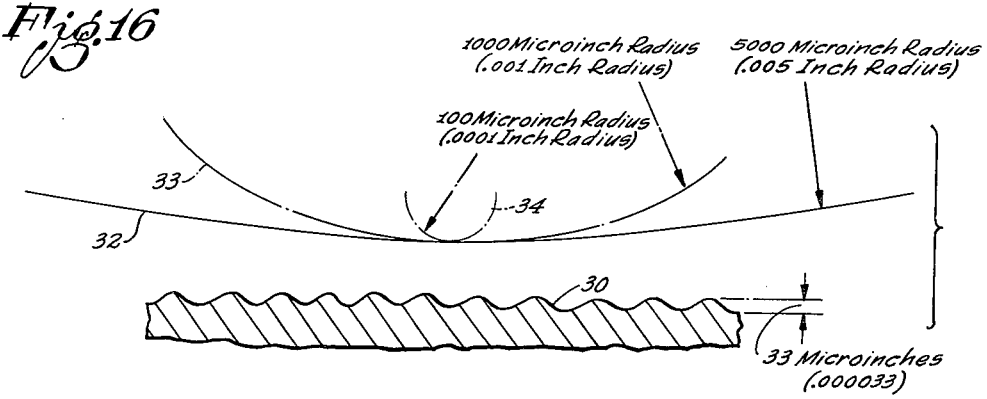
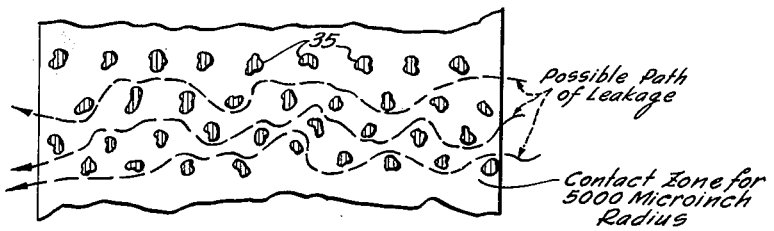
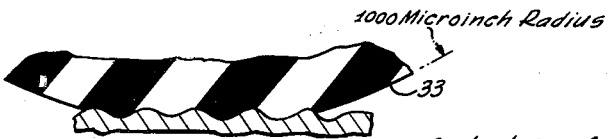
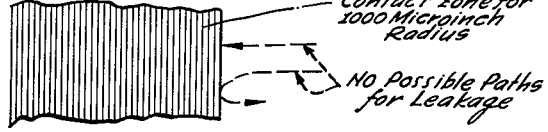
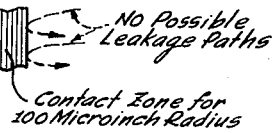

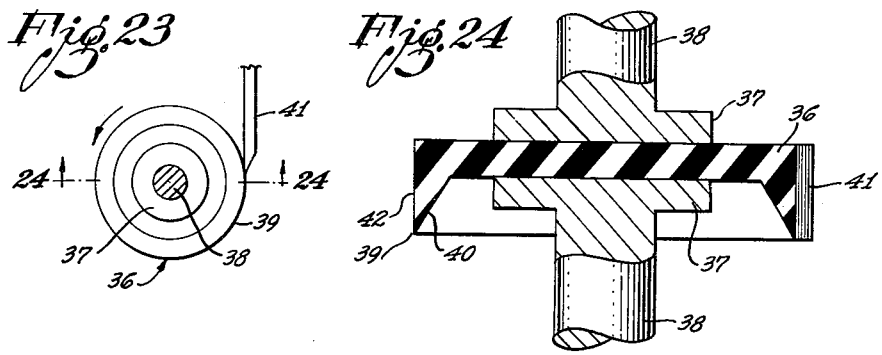
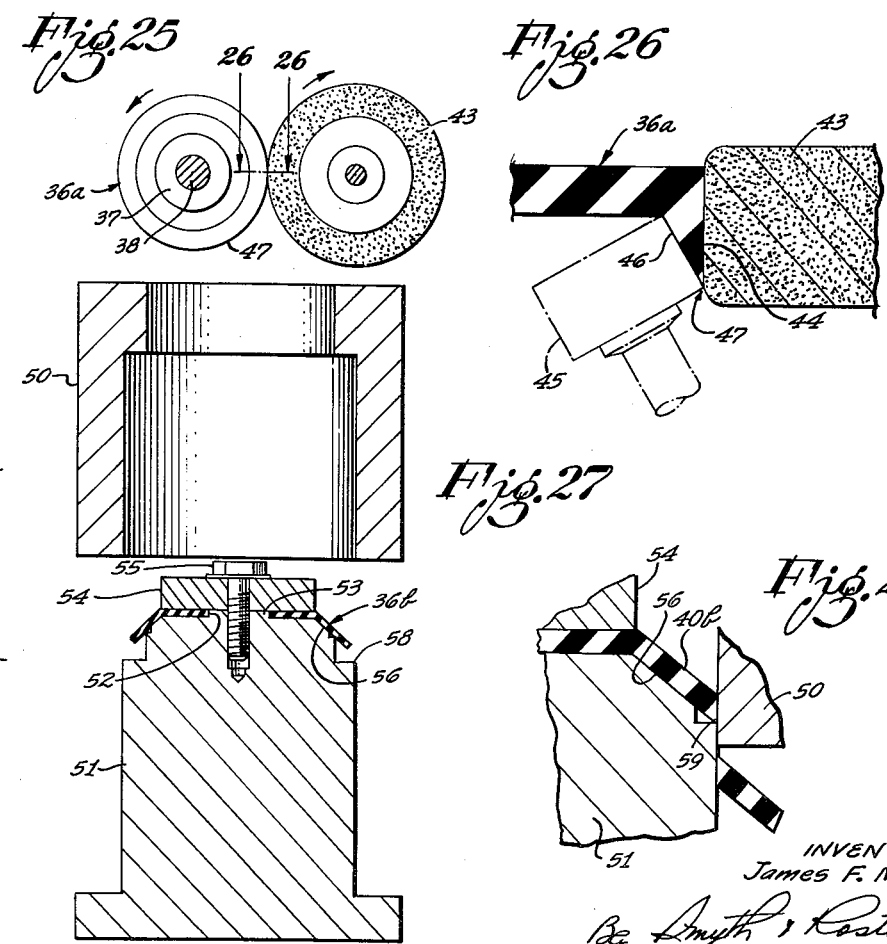

April 25, 1961    J. F. MACK    2,981,282
VALVE DEVICE
Filed Sept. 12, 1958    5 Sheets-Sheet 5
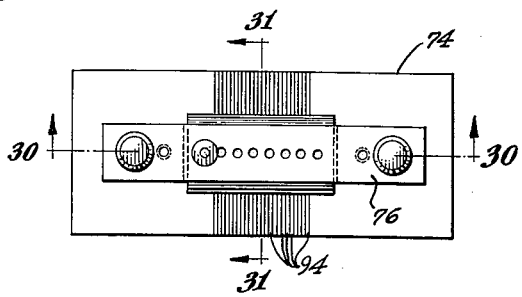
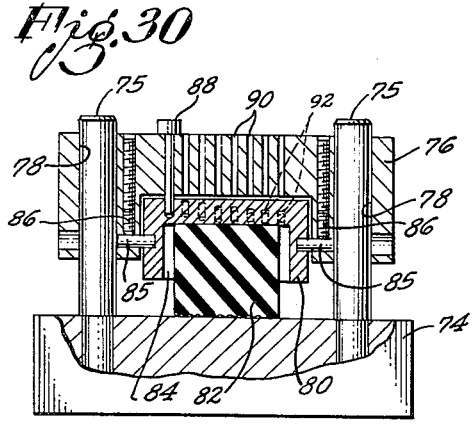
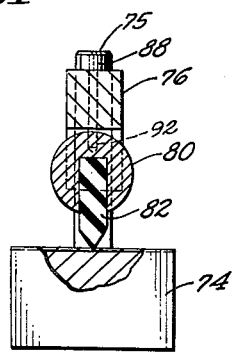
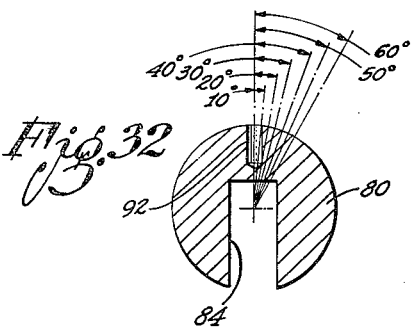
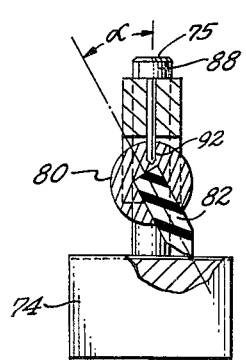
INVENTOR:
James F. Mack
By Smyth & Roston
Attorneys United States Patent Office 2,981,282
Patented Apr. 25, 1961

2,981,282

VALVE DEVICE

James F. Mack, Santa Barbara, Calif., assignor to Mack Company, Goleta, Calif., a copartnership Filed Sept. 12, 1958, Ser. No. 760,637

18 Claims. (Cl. 137—516.29)

This invention relates to valves and is directed to the problem of achieving effective sealing action with minimum sealing force. While such a valve has many uses, it has special utility as a check valve in an installation where a positive fluid-tight seal in the check direction is desired under operating conditions which may include pressure differentials across the valve of relatively large or extremely small magnitude. The present application is a continuation-in-part of my copending application entitled "Valve Device," Serial No. 511,219, filed May 26, 1955, now abandoned.

It has been a long-standing problem in a valve of this type to achieve an effective fluid seal during those operating phases when the pressure differential across the valve is of a magnitude which provides but an exceedingly light closing force. Where there exists pressure differentials of sufficiently greater magnitude, positive closure of the valve element is simply achieved as a result of the consequent increase in closing force acting upon the valve element. My invention teaches that only an exceedingly light seating force is necessary for an effective fluid seal if certain requirements are met. The first requirement is that the valve element that cooperates with the valve seat be made of a resilient plastic material such as a suitable elastomer that is yieldingly deformable to conform to the minute surface irregularities of a valve seat. A second requirement is that the valve element have a relatively sharp leading edge of a cross-sectional configuration formed by two surfaces converging at an acute angle.

A third requirement is that the relative movement between the valve element and the cooperating valve seat be substantially edgewise of the valve element, i.e., in a direction substantially within the above-mentioned acute angle. Finally, a fourth requirement is that the surface of the valve seat be perpendicular to a line in the range defined by the same acute angle so that the edge of the valve element is compressed edgewise by contact with the valve seat.

The successful sealing action achieved in this manner may be understood when the nature of the surface of a valve seat is considered. Even a valve seat that is finished with the best available techniques is revealed under a microscope as having an irregular surface of random hills and valleys so that the problem of attaining an effective seal is the problem of filling and blocking off the valleys to provide a continuous fluid-confining zone.

With a valve element of a given capability of resilient plastic deformation, a given force per unit area is required to cause the material to make continuous contact with the minute irregularities of a valve seat surface and the magnitude of the required force will depend on the total area involved. The "knife edge" principle taught by the present invention provides a continuous annular sealing zone that is exceedingly narrow so that the total sealing area is reduced to a minimum with consequent minimizing of the required sealing force.

It is apparent from the foregoing that the principles of the invention may be utilized for improved valve performance even where the requirement is not for minimum possible sealing force. The invention teaches, however, that with a valve seat of given surface finish, the valve's low pressure sealing characteristics are improved in direct relation to the degree of sharpness of the leading edge of the valve element.

In this regard, an important feature of the invention is the concept of forming the leading edge of a plastic or rubber-like valve element by removing material from an oversized blank element. The material may be removed by shearing or by cutting or by abrasion. Such a technique may be used to produce a leading edge having a radius that is a small fraction of 5000 microinches (.005 inch radius), whereas a typical molded or unprocessed edge has a minimum radius on the order of 5000 microinches.

The various features and advantages of the invention may be understood from the following detailed description considered with the accompanying drawings.

In the drawings, which are to be regarded as merely illustrative:

Fig. 1 is a longitudinal sectional view of an embodiment of the invention in the form of a check valve;

Fig. 2 is an enlarged sectional view of the valve member in Fig. 1, the valve member being provided with a sharp-edged resilient valve element in accord with the teaching of the invention;

Figs. 3, 4, 5 and 6 are diagrammatic views indicating how a valve element having an edge of the desired character may be produced by removing material from a blank by such operations as shearing, cutting or grinding;

Figs. 7, 8, 9 and 10 are diagrammatic views showing valve elements of various configurations and showing in each instance the relation between the configuration of the valve element and the direction of relative movement between the valve element and the cooperating valve seat;

Fig. 11 is a sectional view of an embodiment of the invention in which the valve element is stationary and a valve seat member is movable relative thereto;

Fig. 12 is a longitudinal sectional view of another embodiment of the invention;

Fig. 13 is a similar view of an embodiment of the invention employing a single piece valve member of yieldingly deformable material;

Fig. 14 is a sectional view of an embodiment of the invention that employs a slightly tapered valve seat;

Fig. 15 is an enlarged fragment of Fig. 14 showing the relation between the direction of the closing force and the configuration of the valve element and also showing the relation between the surface of the valve seat and the configuration of the valve element;

Fig. 15a is a view similar to Fig. 15, illustrating a high pressure valve;

Fig. 16 is a diagram showing the surface profile of a carefully finished valve seat and showing the profiles of three different leading edges of valve elements, one leading edge being a molded edge having a relatively large radius and the other two leading edges being cut or ground edges having relatively short radii;

Fig. 17 is a diagrammatic view showing how the leading edge of the largest radius is deformed by contact with the valve seat surface under a given applied force that results in a relatively small pressure per unit area of contact, the deformation being insufficient for an effective seal;

Fig. 18 is a diagrammatic view showing the islands of pressure contact that are produced by the leading edge under the pressure indicated in Fig. 17;

Fig. 19 is a diagrammatic view similar to Fig. 17 showing how the second leading edge of smaller radius subjected to the same given force provides a higher stress within a smaller area of contact and thereby permits a greater degree of local deformation to take place within the valve lip for microscopic adjustment with the surface irregularities of the mating part;

Fig. 20 is a diagrammatic view similar to Fig. 18 showing the pattern of the area of contact that is produced with the second sharper leading edge of Fig. 19 under the same given applied force;

Fig. 21 is a diagrammatic view similar to Figs. 17 and 19 showing how the third leading edge of the smallest radius is deformed by the same applied force;

Fig. 22 is a diagrammatic view similar to Fig. 20 showing the area of contact that is produced by the third leading edge;

Fig. 23 is a simplified bottom plan view showing how the leading edge may be formed on a valve element by applying a cutting tool to the periphery of a valve element blank with the blank rotating at high speed;

Fig. 24 is a section on the line 24—24 of Fig. 23;

Fig. 25 is a simplified bottom view indicating how the leading edge may be formed by applying a grinding wheel to the periphery of the valve element blank to remove material therefrom;

Fig. 26 is a diagrammatic view showing the same operation as Fig. 25 and also indicating how a second grinding wheel or cutting tool may be applied to a second surface of the valve element blank to produce the desired leading edge;

Fig. 27 is a sectional view showing how a pair of dies may be used to shear a blank for forming the desired leading edge;

Fig. 28 is a fragmentary sectional view showing the shearing action of the pair of dies of Fig. 27;

Fig. 29 is a plan view of a small testing device that may be used to demonstrate the principles underlying the invention;

Fig. 30 is a view of the same device largely in longitudinal section and partly in side elevation, the section being along the line 30—30 of Fig. 29;

Fig. 31 is a view of the same device largely in transverse cross section and partly in end elevation, the cross section being along the line 31—31 of Fig. 29;

Fig. 32 is a transverse sectional view of a rotatably adjustable holder for the valve element that is employed in the testing device, showing the angles at which various bores are provided in the holder to turn the valve element to corresponding angles relative to the vertical; and Fig. 33 is a view similar to Fig. 28 showing the holder positioning a valve element at an acute angle relative to the vertical.

The concepts on which the invention is based may be understood by first considering Figs. 16–20 of the drawings.

Fig. 16 shows a typical profile 30 of a highly finished valve seat surface of 30 microinches R.M.S. On the same scale the curve 32 is the cross section of a leading edge of a valve member which has a radius of 5000 microinches (.005 inch radius), which is the shortest radius to which plastic material such as elastomers can be molded. The second curve 33 is the cross section of a processed leading edge having a radius of 1000 microinches (.001 inch radius) which is five times sharper than the molded edge. The third curve 34 is the cross section of an even sharper processed leading edge having a radius of 100 microinches (.0001 inch radius) which is fifty times sharper than the molded edge.

Fig. 17 shows how the molded leading edge 32 of a valve element of rubber-like material is deformed when pressed against the surface represented by the profile 30, the valve element being under a force that is not sufficient to cause the resilient material to fill the valleys of the surface. Fig. 18, which is drawn to the same scale, indicates how the molded leading edge 32 of the valve element makes contact with the valve seat surface over a relatively wide zone. Since the valve element conforms only to the upper levels of the hills of the valve seat surface, the pattern of contact over the zone consists of numerous small islands 35 and since the contact area is not continuous, leakage occurs across the zone as indicated by the dotted lines.

Fig. 19 shows on the same scale how the same force applied to a second valve element having a sharper leading edge 33 completely causes the second valve element to conform to the irregularities of the valve seat surface and reach the bottoms of the valleys. The result is a narrower zone of continuous sealing contact as shown in Fig. 20. It is to be emphasized that although the same valve closing force is applied in both instances, the smaller sealing area of the sharper leading edge 33 results in a higher unit stress and correspondingly greater deformation of the leading edge of the valve element to produce the continuous fluid-tight sealing zone in Fig. 20.

Fig. 21 shows on the same scale the same force applied to a third valve element having an even sharper leading edge 34. The resulting unit stress is still higher to result in completely effective sealing contact over the narrower zone shown in Fig. 22.

Figs. 23–28 indicate, by way example, some of the techniques that may be employed to remove material from a valve element blank to produce a leading edge of substantially greater sharpness than a molded edge. In Figs. 23 and 24, a valve element blank 36 is clamped between two coaxial clamp members 37 on the ends of two corresponding rotary shafts 38 for the purpose of rotating the blank concentrically at high speed. The desired sharp leading edge 39 may be produced by molding the blank 36 with a flared inner surface 40 and then applying a sharp cutting tool 41 to the rotating periphery of the blank to cut away a portion of the material and thus produce a peripheral surface 42 that converges on the surface 40 to form the leading edge 39.

Figs. 25 and 26 show how a blank 36a mounted for rotation in the same manner may be processed by the application of a grinding wheel 43 to produce a peripheral surface 44 and Fig. 26 shows in phantom how a second grinding wheel 45 may be applied to produce a second flared surface 46, the two surfaces converging to form the sharp leading edge 47.

Figs. 27 and 28 show how a pair of dies 50 and 51 may be employed to shear the periphery of a molded blank 36b to produce a leading edge of the desired character by shearing the blank. The molded blank 36b has a central aperture 52 which is engaged by a centering boss 53 on the lower die 51 and the blank is temporarily clamped in place by a keeper disk 54 and cap screw 55. The exposed portion of the molded blank 36b rests on a conical surface 56 of the lower die. A cylindrical shearing edge 57 of the upper die 50 cooperates with a similar shearing edge 58 of the lower die 51 to produce the desired sharp leading edge 59, as indicated in Fig. 28. By varying the angle of inclination of surface relative to the direction of shearing, the character and attitude of the sheared edge obtained by this means can be controlled to provide the particular configuration desired.

Fig. 3 shows a portion of a valve element 60 having a sharp leading edge 62 formed by removing material from a valve element blank, the starting configuration of the blank being shown in dotted lines. Fig. 4 shows how a blank of the configuration indicated by the dotted lines may be cut away to provide a valve element 64 with a sharp leading edge 65. In this instance, both of the surfaces that converge to form the leading edge are formed by removing material from the original blank.

Fig. 5 shows a valve element 66 of another configuration with a leading edge 68 formed by two converging surfaces which are the result of removing material from a blank of the configuration indicated by the dotted lines.

Fig. 6 shows how a leading edge 70 of exceptional sharpness may be formed on a valve element 72 by drastically removing material from a starting blank having the configuration shown in dotted lines.

Figs. 7, 8, 9 and 10 show diagrammatically how the valve elements of Figs. 3, 4, 5 and 6 respectively may each be oriented through a range of angles relative to the direction of relative movement between the valve element and the cooperating valve seat. In each of these views, the arrow D indicates the direction of relative movement between the valve member and the valve seat.

Fig. 7 shows how the valve element 60 of Fig. 3 may have the position 60a at which the direction D substantially coincides with one of the two convergent surfaces that form the leading edge and this figure also shows how the valve element may take the position 60b at which the other of the two convergent surfaces substantially coincides with the direction of valve action. These two positions 60a and 60b define the approximate angular range of positions at which the valve element 60 may be oriented to cause sealing action by edgewise compression of the leading edge. The valve element may be oriented anywhere in this angular range, for example, at the intermediate position 60c.

In like manner, Fig. 8 shows two approximate limit positions 64a and 64b for the valve element 64 of Fig. 4 and shows an intermediate position 64c, all of these positions being oriented relative to the direction of valve operation to meet the requirement that the valve element be compressed edgewise instead of flexed sidewise. In like manner, Fig. 9 shows three corresponding positions 66a, 66b and 66c for the valve element 66 of Fig. 5; and Fig. 10 shows three corresponding positions 72a, 72b and 72c for the valve element 72 of Fig. 6.

Figs. 29-33 show how a small test device may be used to demonstrate the basic principle of the invention. The device comprises a base block 74 of metal carrying a pair of upright guide posts 75 on which is mounted a carriage 76. The carriage 76 comprises a second metal block having a pair of parallel bores 78 which slidingly embrace the two guide posts 75.

The underside of the carriage 76 is cut away to straddle a pivoted holder 80 which is adapted to hold a valve element 82 in a replaceable manner. The holder 80 is of cylindrical configuration and, as shown in Figs. 30 and 32, is formed with a longitudinal recess 84 on its underside to receive the valve elements to be tested. The holder 80 is mounted to rotate on its longitudinal axis and for this purpose may be bored at its opposite ends to receive a pair of pivot pins 85, the pivot pins being mounted in the carriage 76 and being secured by set-screws 86.

The pivoted holder 80 may be held at selected positions of rotation by a headed pin 88 which may be inserted in any one of a longitudinal series of vertical bores 90 in the carriage 76. As indicated in Figs. 30, 32 and 33, the pivoted holder 80 has a corresponding series of radial bores 92 which may be registered with the bores 90 to receive the headed pin 88 but these radial bores are at various angles for use in holding the pivoted holder 80 at various rotary positions. As indicated in Fig. 32, these two sets of bores may be used selectively to position the valve element in the holder 80 at angles of 10, 20, 30, 40, 50 and 60 degrees relative to the vertical. Fig. 31 shows the holder 80 maintaining the valve element 82 in a vertical position and Fig. 33 shows the holder positioning the valve element at a substantial angle relative to the vertical.

For the purpose of test and demonstration, a series of fine transverse grooves 94 are cut in the upper surface of the base block 74 in the region where the valve element 82 in the holder 80 makes contact with the base block. These grooves 94 form corresponding ribs which represent a surface finish in scale with the valve element. The weight of the carriage 76 together with the weight of the pivoted holder 80 provides the valve seating force and this force may be varied by using a series of carriages interchangeably, the series of carriages being of graduated weights. The valve elements used in the series of tests, such as the valve element 82 in Figs. 30, 31 and 33, may be made of any suitably deformable elastomer.

Whether or not a sealing element such as the sealing element 82 in the holder 80 makes successful sealing contact with the serrated surface of the test block 74 formed by the grooves 94 may be ascertained by holding the test block up to the light in the position shown in Fig. 27. If no light is visible between the leading edge of the valve element and the serrated surface of the base block, the weight imposed on the valve element is sufficient to produce a seal. If light can be seen between the valve element and the base block, the seal is not accomplished.

It becomes evident by interchanging carriages of varied weights and valve elements of varied configurations and shore hardnesses, and testing each element together with the pivotable seat surface through successive angles of inclination, that for any applied closing force maximum sealing is obtained when the particular element being tested and the pivotable seat surface are positioned in such a manner that there be edgewise compression of the valve element, for example: when the angle between the direction of the closing force and a line perpendicular to the valve seat surface falls substantially within the angular range defined by the two convergent edge-forming surfaces of the valve element. Unless the orientation of the valve element and the valve seat surface relative to each other fall within this angular range, there results sidewise flexure of the valve element which causes it to ride upon the ridges of the serrated surface, thereby increasing the area of contact and necessitating a much greater force to achieve complete closure. Where compression is edgewise of the leading edge of the valve element, however, as hereinbefore defined, the exceedingly narrow zone of contact presented provides a greater degree of local deformation per given closing force with consequent increase in sealing effectiveness.

Particularly in evidence are the superior sealing characteristics under all conditions displayed by a sheared or similarly processed edge as compared to a molded or unprocessed edge. In this test device, all valve elements are scaled in direct proportion to the enlargement of the seat surface finish (125 to 1) to illustrate respective seal-values when directed against a typical highly machined seat surface.

In the first embodiment of the invention shown in Fig. 1, a valve body, generally designated by numeral 100, comprises two body sections 101 and 102 threaded together with the joint sealed by a suitable sealing ring 104. The opposite ends of the valve body 100 are threaded as shown for connection into a fluid system. The inner end of the body section 102 presents an annular shoulder 105 which serves as a valve seat for cooperation with a valve element 106 of a valve member 108.

The valve member 108 may be pivotally mounted in any suitable manner. In the construction shown, the means for pivotally mounting the valve member 108 includes a bracket 110 that is suitably mounted on the inner end of the body section 102. An arm 112 is pivotally mounted on the bracket 110, and for this purpose is formed with a pair of ears 114 to receive a pivot pin 115, the pivot pin extending through the bracket 110. A torque spring 116 is mounted on the pivot pin 115 with one end engaging the arm 112, and the other end seated in a small recess 118. This torque spring resiliently urges the arm 112 in a clockwise direction as viewed in Fig. 1. The free end of the arm 112 is formed with an opening to receive a boss 120 of the valve member 108 in a loose manner that permits a slight range of freedom of the valve member relative to the arm.

As best shown in Fig. 2, the valve member 108 may comprise a lower disk 122 and an upper disk 124 held together by a rivet 125. Additionally, the rivet 125 anchors a washer 126 on the outer end of the boss 120 to retain the valve member on the end of the arm 112. The lower disk 122 of the valve member 108 is cut away to form a circumferential recess 128 to receive the valve element 106, and the upper disk 124 is formed with a flared flange 130 which overhangs this recess. The recess 128 has a conically curved surface 132.

The valve element 106 is made of rubber or suitably resilient material and may be molded to conform to the configuration of the circumferential recess 128 and sheared or otherwise processed as an oversized molded part to produce a leading edge of the desired sharpness either before or after assembly into valve member 108. In another practice of the invention, the valve element 106 may be a flat ring which is deformed by the overhanging upper disk 124 to conform to the conically curved peripheral surface 132 of the lower disk 122. The valve element 106 has a leading edge 134 for cooperation with the valve seat 105. This leading edge may be formed by starting with an oversize flat valve element blank which is clamped between the two disks 122 and 124 and is thereby deformed to the configuration indicated by the dotted line in Fig. 2. The clamped blank is then sheared by a pair of dies of the character shown in Fig. 25 or formed by any of the techniques heretofore described to produce the leading edge 134 of the desired sharpness. Processing of the flat ring element to produce the desired degree of sharpness may be performed before assembly, but is preferably accomplished following assembly to assure perfect concentricity.

In Fig. 11 illustrating a second embodiment of the invention, a valve body, generally designated 135, comprises two body sections 136 and 137 which are screwed together and sealed by an O-ring 138. A valve element 140 of rubber-like material is fixedly seated in an annular recess 142 in the inner end of the body section 137 and has an upwardly directed leading edge of sharp configuration to cooperate with a movable valve seat member 144.

The valve seat member 144 is loosely mounted in the previously described manner on the end of an arm 145 that is pivoted on a bracket 146. Here again, a light torque spring 148 is mounted on the pivot pin 150 to bias the valve seat member 144 to closed position. The sharp leading edge of the valve element 140 may be produced by any of the techniques heretofore described.

The embodiment of the invention shown in Fig. 12 has a valve body 152 made in two sections 153 and 154 with the joint sealed by an O-ring 155. The inner end of the body section 153 forms a seat 156 for cooperation with a valve element 158 of rubber-like material that is part of a valve member 160. The valve member 160 comprises a disk 162 and a cup-shaped member 164 which are held together by a rivet 165 and which form an annular recess to retain the valve element 158. The cup-shaped member 164 is formed with a series of inclined bores 166 which are part of the passage for fluid flow when the valve is open. A light coil spring 168 seats in the cup-shaped member 164 and backs against an annular shoulder 170 to urge the valve member towards its closed position. Here again, the valve element 158 has a sharp leading edge which may be produced by any of the techniques heretofore described.

The embodiment of the invention shown in Fig. 13 has a valve body 172 made in two sections 173 and 174 with the joint sealed by a flat washer 175. The body section 173 is formed with an inner annular shoulder 176 which serves as a valve seat for a valve element 178. The valve element 178 is a cup-shaped member of rubber-like material which is formed with a relatively sharp leading annular edge 180. This edge may be formed by any of the previously described techniques. The cup-shaped valve element 178 is formed with a series of longitudinal grooves 182 to permit fluid to flow past the valve element when it is in its open position. At its open position, the valve element 178 backs against a cylindrical skirt 184 at the inner end of the body section 174, the skirt being formed with recesses 185 to permit fluid flow through the open valve.

Fig. 14 illustrating another embodiment of the invention shows a valve construction in which a valve member 186 has a valve element 188 of rubber-like material to cooperate with a seat member 190 having a conically curved seat surface 192. The valve member 186 is of a previously described construction comprising two disks 194 and 195 held together by a rivet 196, and the valve member is loosely mounted in the manner heretofore described on an arm 198 that is pivoted to a bracket 200 and is biased to closed position by a suitable spring 201.

Fig. 15 is an enlarged fragment of Fig. 14, showing the relationships that exist with respect to the valve element 188, the direction of the closing force represented by the arrow 202 and the slope of the valve seat surface 192. Since the direction of the arrow 202 coincides with the cylindrically curved peripheral surface 204 of the valve member 188, this arrangement satisfies the requirement that the direction of the closing force lies substantially within the angle defined by the two faces that form the leading edge 205 of the valve element. It will also be noted that a dotted line 206 perpendicular to the cross-sectional profile of the valve seat surface 192 also lies within this angle to satisfy another requirement taught by the invention. With these requirements met by the construction, the valve element 188 is compressed edgewise in response to seating force.

Fig. 15a shows how the structure shown in Fig. 15 may be modified slightly to provide a valve that will require a relatively light closing force and yet will withstand an exceedingly high pressure in the direction of the closing force. The construction shown in Fig. 15a is largely similar to the construction in Fig. 15, as indicated by the use of corresponding numerals to indicate corresponding parts. In the closing action of the valve in Fig. 15a, the sharp leading edge of the resiliently deformable valve element 188a makes sealing contact with the valve seat surface 192 slightly before the tapered surface 208 of the valve member disk 194 makes mating contact with the tapered valve seat surface 192. Thereafter, the two surfaces 208 and 192 close together to form, in effect, a solid metal backing for the sealing lip of the valve element 188a to support the sealing lip along its inner circumferential surface in opposition to fluid pressure and to keep the fluid pressure from deflecting the sealing lip radially inward to such extent as to break the seal.

In explaining the functioning of the various forms of the invention, the emphasis has been on the capability of the valve element to provide a fluid-tight seal with exceedingly light seating force. It is to be noted, however, that such a valve element may be used to withstand pressure differentials of high magnitude, including pressure differentials exceeding 3000 p.s.i., the valve element under such conditions flexing and further adapting with more than a sufficiency of closing force to assure a fluid-tight seal.

My description in specific detail of the selected practices of the invention will suggest various changes, substitutions and other departures from my disclosure within the spirit and scope of the appended claims.

I claim:

1. In a valve for closing action in response to a light operating force, the combination of: a first valve means forming an annular valve seat of hard unyielding material; a second valve means providing an annular valve element of resilient plastic material yieldingly deformable to conform to minor irregularities in the surface of the valve seat, said valve element having a leading edge formed by two surfaces converging at an acute angle, said edge being substantially sharper than an edge having a radius of 5000 microinches said two valve means being movable towards each other in a given direction for closing action, the surface of said valve seat being perpendicular to a line substantially within said acute angle and said given direction also being substantially within said acute angle whereby said valve element closes edgewise against said valve seat with substantially edgewise compression of the valve element.

2. A combination as set forth in claim 1, in which said leading edge has a sharpness equivalent to a radius on the order of 1000 microinches.

3. A combination as set forth in claim 1, in which said leading edge has a sharpness of a radius substantially in the range of 100 microinches to 1000 microinches.

4. In a valve, the combination of: a first valve means having a valve seat surface; a second valve means cooperative with said first valve means, one of said valve means being movable in a given direction relative to the other for closing action; an annular valve element included in said second valve means and made of resiliently deformable nonmetallic material to conform to minor irregularities in the surface of the valve seat for sealing action therewith, said valve element having a leading edge formed by two surfaces converging at an acute angle, said leading edge being substantially sharper than an edge having a radius of 5,000 microinches, said valve seat surface being perpendicular to a line substantially within said acute angle and said given direction also being substantially within said acute angle whereby said valve element closes edgewise against said valve seat with substantially edgewise sealing compression of the valve element; and solid means included in said second valve means to abut said valve seat surface after said valve element makes sealing contact therewith, said solid means being on the side of said leading edge to cooperate with said first valve means to back up said leading edge against flexure by the fluid pressure.

5. A method of forming an annular valve element of resilient plastic material for cooperation with an annular valve seat member by relative movement between the valve element and the seat member in a direction for valve closing action, said method comprising a procedure of shaping a resilient plastic body with two annular surfaces forming a leading edge and converging towards said leading edge at an acute angle, which angle includes said direction, said procedure being characterized by the step of removing material from said body to form at least one of said annular surfaces and to give said leading edge a sharpness equivalent to a radius of curvature substantially less than 5000 microinches.

6. A combination as set forth in claim 5, in which said step of removing material is a shearing step.

7. A method as set forth in claim 5, in which said step of removing material comprises rotating said body at relatively high speed and applying material-removing means to the surface of the rapidly rotating body.

8. A method as set forth in claim 7, in which said material-removing means is a tool with a cutting edge.

9. A combination as set forth in claim 7, in which said material-removing means is an abrasive means.

10. A method as set forth in claim 5, in which material is removed from said body to form both of said surfaces.

11. A method of forming an annular valve element for use on a holder means to cooperate with a valve seat member by relative movement between the holder means and the seat member in a given direction for closing action, comprising: providing a holder means with a circumferential recess of conical curvature diverging in said one direction; mounting a body of resilient plastic material in the form of a flat ring in said recess whereby the flat ring is distorted to take the divergent conical curvature of said recess, said ring being oversized relative to the recess to extend peripherally from said holder means around the circumference thereof, the extended portion of the ring having an inner conically curved surface; and removing material from the extended periphery of said ring to form a second peripheral surface convergent with said inner surface at an acute angle and forming therewith a leading edge substantially sharper than an edge having a radius on the order of 5000 microinches, said acute angle including said one direction.

12. In a valve for closing action in response to a light closing force, the combination of: a first valve means forming an annular valve seat of hard unyielding material; a second valve means in the form of a circular member of rubber-like material yieldingly deformable to conform to minor irregularities in the surface of the valve seat, said member having a flat inner annular portion surrounded by an outer portion, said outer portion having a circumferential flange directed towards said valve seat, said flange having a leading edge formed by two surfaces converging at an acute angle, said edge being substantially sharper than an edge having a radius of 5000 microinches, said two valve means being movable towards each other in a given direction for closing action, the surface of said valve seat being perpendicular to a line substantially within said acute angle and said given direction also being substantially within said acute angle whereby said flange closes edgewise against said valve seat with substantially edgewise compression of the flange.

13. In a valve for closing action in response to a light closing force, the combination of: a first valve means forming an annular valve seat of hard unyielding material; a second valve means in the form of an annular member of rubber-like material yieldingly deformable to conform to minor irregularities in the surface of the valve seat, said member having a flat configuration when unrestrained; and restraining means flaring the peripheral marginal portion of said member towards said valve seat, said member at its restrained flared configuration having a leading edge formed by two surfaces converging at an acute angle, said edge being substantially sharper than an edge having a radius of 5000 microinches, said two valve means being movable towards each other in a given direction for closing action, the surface of said valve seat being perpendicular to a line substantially within said acute angle and said given direction also being substantially within said acute angle whereby said leading edge closes edgewise against said valve seat with substantially edgewise compression.

14. A combination as set forth in claim 12 in which said second valve means includes an unyielding member surrounded by said flange and set back from the plane of said leading edge to contact said valve seat after the leading edge contacts the valve seat thereby to resist radial inward flexure of the flange by fluid pressure when the valve is closed.

15. A combination as set forth in claim 12 in which said second valve means includes a pair of rigid annular elements positioned against the opposite sides of said member for support and reinforcement of the member.

16. In a valve for closing action in response to a light closing force, the combination of: a first valve means forming an annular valve seat of hard unyielding material; and a second valve means, said second valve means comprising a generally cylindrical member of rubber-like material and a rigid annular structure reinforcing the inner and outer circumferences of said cylindrical member, said cylindrical member being yieldingly deformable to conform to minor irregularities in the surface of the valve seat, said cylindrical member having a leading edge formed by two surfaces converging at an acute angle, said edge being substantially sharper than an edge having a radius of 5000 microinches, said two valve means being movable towards each other in a given direction for closing action, the surface of said valve seat being perpendicular to a line substantially within said acute angle and said given direction also being substantially within said acute angle whereby said cylindrical member closes edgewise against said valve seat with substantially edgewise compression of the cylindrical member.

17. In a valve for closing action in response to a light closing force, the combination of: a first valve means forming an annular valve seat of hard unyielding material; and a second valve means in the form of a cup-shaped member of rubber-like material yieldingly deformable to conform to minor irregularities in the surface of the valve seat with its bottom positioned to cooperate with said valve seat, said bottom being formed with a circumferential flange directed towards said valve seat for contact therewith, said flange having a leading edge formed by two surfaces converging at an acute angle, said edge being substantially sharper than an edge having a radius of 5000 microinches, said two valve means being movable towards each other in a given direction for closing action, the surface of said valve seat being perpendicular to a line substantially within said acute angle and said given direction also being substantially within said acute angle whereby said flange closes edgewise against said valve seat with substantially edgewise compression of the flange.

18. A combination as set forth in claim 17 which includes a coiled spring seating inside the cup-shaped member to urge the cup-shaped member toward said valve seat.

References Cited in the file of this patent

UNITED STATES PATENTS

| | | |
|---|---|---|
| 2,573,177 | Bohlen | Oct. 30, 1951 |
| 2,593,740 | Faust | Apr. 22, 1952 |
| 2,613,054 | Maier | Oct. 7, 1952 |
| 2,682,701 | Pote | July 6, 1954 |
| 2,738,159 | Fleming | Mar. 13, 1956 |
| 2,786,645 | Ralston | Mar. 26, 1957 |
| 2,812,776 | Lofftus | Nov. 12, 1957 |
| 2,821,356 | Rand | Jan. 28, 1958 |
| 2,840,336 | Suthann | June 24, 1958 |